United States Patent
Moulsley et al.

(10) Patent No.: US 8,665,987 B2
(45) Date of Patent: Mar. 4, 2014

(54) SPACE-TIME/SPACE-FREQUENCY CODING FOR MULTI-SITE AND MULTI-BEAM TRANSMISSION

(75) Inventors: Timothy James Moulsley, Caterham (GB); David Keith Roberts, Crawley (GB); Matthew Peter John Baker, Canterbury (GB); Xusheng Wei, Horley (GB)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 865 days.

(21) Appl. No.: 12/438,149

(22) PCT Filed: Aug. 21, 2007

(86) PCT No.: PCT/IB2007/053333
§ 371 (c)(1),
(2), (4) Date: Feb. 20, 2009

(87) PCT Pub. No.: WO2008/023332
PCT Pub. Date: Feb. 28, 2008

(65) Prior Publication Data
US 2009/0190681 A1    Jul. 30, 2009

(30) Foreign Application Priority Data
Aug. 21, 2006 (EP) .................................. 06119253

(51) Int. Cl.
*H04L 27/00* (2006.01)
(52) U.S. Cl.
USPC ........... 375/295; 375/316; 375/219; 375/267; 375/299; 375/130; 370/203; 370/204; 455/101

(58) Field of Classification Search
USPC ................. 375/295, 316, 219, 267, 299, 130; 370/203, 204; 455/101
See application file for complete search history.

(56) References Cited

U.S. PATENT DOCUMENTS

| 6,101,399 | A  | * | 8/2000 | Raleigh et al. ................ 455/561 |
| 6,870,515 | B2 |   | 3/2005 | Kitchener et al. |
| 7,477,697 | B2 | * | 1/2009 | Pauli et al. ..................... 375/267 |
| 2001/0031647 | A1 |   | 10/2001 | Scherzer et al. |
| 2002/0085643 | A1 |   | 7/2002 | Kitchener et al. |
| 2003/0092379 | A1 |   | 5/2003 | Brothers, Jr. et al. |

(Continued)

FOREIGN PATENT DOCUMENTS

| EP | 1471663 A2 | 10/2004 |
| JP | 11341540 A | 12/1999 |

(Continued)

OTHER PUBLICATIONS

S. M. Alamouti, A simple transmit diversity technique for wireless communications, IEEE Journal, Select, Areas, Commun., vol. 16, No. 8, Oct. 1998, pp. 1451-1458.

*Primary Examiner* — Zewdu Kassa

(57) ABSTRACT

The present invention relates to space-time or space-frequency coding in cellular systems. The same data is transmitted from different antennas with different coverage areas, corresponding to different cells. The different data streams have different parts of the space-time block codes applied. A mobile terminal can combine the different parts of the space-time block codes in different received signals. This provides better performance than the known techniques for single frequency networks. The invention can also be applied to antennas with different coverage areas from the same site, and different beams formed with antenna arrays.

16 Claims, 1 Drawing Sheet

(56) References Cited

U.S. PATENT DOCUMENTS

| | | | |
|---|---|---|---|
| 2004/0198235 A1 | 10/2004 | Sano | |
| 2004/0213187 A1 | 10/2004 | Fujil | |
| 2004/0218569 A1* | 11/2004 | Pedersen et al. | 370/334 |
| 2004/0246998 A1* | 12/2004 | Ma et al. | 370/527 |
| 2005/0073976 A1 | 4/2005 | Fujii | |
| 2005/0250468 A1 | 11/2005 | Lu et al. | |
| 2006/0115057 A1 | 6/2006 | Laliberte | |
| 2006/0233271 A1* | 10/2006 | Savas et al. | 375/260 |
| 2006/0233275 A1* | 10/2006 | Chen et al. | 375/267 |
| 2009/0129334 A1* | 5/2009 | Ma et al. | 370/331 |

FOREIGN PATENT DOCUMENTS

| | | |
|---|---|---|
| JP | 2003023381 A | 1/2003 |
| JP | 2003069493 A | 3/2003 |
| JP | 2004328464 A | 11/2004 |
| JP | 2005536130 A | 11/2005 |
| WO | 02061878 A2 | 8/2002 |
| WO | 2005050871 A1 | 6/2005 |
| WO | 2006002550 A1 | 1/2006 |
| WO | 2006016485 A1 | 2/2006 |
| WO | 2006120297 A1 | 11/2006 |

* cited by examiner

SPACE-TIME/SPACE-FREQUENCY CODING FOR MULTI-SITE AND MULTI-BEAM TRANSMISSION

FIELD OF THE INVENTION

The present invention relates to a method, system, transmitter and receiver for using at least one of space-time and space-frequency codes in a cellular system. In a particular example, the present invention relates to a multi-site and multi-beam transmission system. Moreover, the present invention relates to a computer program product for carrying out the afore-mentioned method.

BACKGROUND OF THE INVENTION

One of the aims of future cellular wireless communication systems is to enhance the achievable data throughput to mobile terminals (MT) situated close to a cell edge. This is important as, assuming a reasonably uniform distribution of MTs over the cell area, then a significant fraction of the MTs in a cell is close to its periphery. When the same carrier frequency is re-used in neighboring cells, the signal from the 'wanted' base station (BS) with which the MT is communicating is received at the cell edge at power levels similar to signals originating from BSs in neighboring cells. Cell edge MTs therefore experience strong interference in addition to low signal to noise ratio (SNR), which makes it difficult to achieve high data rates to these MTs.

In current third generation (3G) systems like the Universal Mobile Telecommunications System (UMTS), macro-diversity and soft-handover techniques are known. These allow simultaneous communication between more than one BS and a MT in order to improve the link quality to MTs at the boundaries between cells. In macro-diversity and soft-handover the same data is transmitted to a MT from multiple BSs. This is achieved by having all transmissions effected on the same carrier frequency, and discriminating transmissions from different BSs based on their different scrambling codes. The MT comprises a receiver arrangement for receiving multiple (CDMA) signals simultaneously, i.e. it has multiple receive signal paths (descrambling and decorrelation) and a combiner to combine the despread symbol streams.

Macro-diversity techniques in 3G systems rely upon code division multiple access (CDMA) techniques in order for a MT to receive a given data stream from more than one BS simultaneously. However, each wanted data stream causes interference to the reception of the other stream.

For future cellular systems, including 3$^{rd}$ Generation Partnership Project (3GPP) Long Term Evolution (LTE) and Wireless World Initiative New Radio (WINNER), multi-carrier (OFDM-based) transmission schemes are being proposed (at least for the downlink). Further, multiple access (sharing the time-frequency resources between MTs) is typically envisaged to be based on allocating different groups of subcarriers to different MTs (orthogonal frequency division multiple access (OFDMA)) rather than on CDMA. The macro-diversity techniques from 3G are therefore not directly applicable to these future systems.

One favored approach for improving cell-edge performance in these future OFDM-based cellular systems is to partition subcarriers between cells, wherein all cells may use all subcarriers at lower transmit powers. This gives coverage to the inner parts of the cell but does not reach the cell edges (and therefore does not cause interference to neighboring cells). For communication to MTs at the cell edges a BS then uses a subset of the total number of available subcarriers where the subsets are defined to be mutually exclusive with the subsets employed in neighboring cells. This prevents higher power transmissions to cell-edge MTs from causing high interference to cell-edge MTs in the neighboring cells.

This approach improves the inter-cell interference situation for cell-edge MTs at the expense of increasing the frequency re-use factor, which results in lower spectral efficiency than re-using all subcarriers in all parts of every cell (i.e., frequency re-use factor of one). It may also reduce the peak throughput to cell-edge users since only a subset of the total number of subcarriers are available for use.

A straight forward extension of the 3G macro-diversity ideas to these OFDM systems would be to use the cell-edge subcarrier subsets of two or more neighboring cells to transmit to a MT. The MT would then receive the same data from multiple BSs (via different subsets of subcarriers) and can combine these to enhance the data reception quality. The downside of this approach is of course that this consumes resources (subcarriers) in two or more cells for the benefit of one MT. This is analogous to 3G macro-diversity, which requires resources (spreading codes) to be allocated in two or more cells for the benefit of one MT, and requires the MT to receive and combine two or more signals.

A related piece of prior art is the operation of Single Frequency Networks (SFN), which are known in broadcast systems such as Digital Audio Broadcasting (DAB) and Digital Video Broadcasting (DVB). In these OFDM systems the same data signal is broadcast from all transmitters. In the regions approximately mid-way between two transmitters, the receiving terminal receives a super-position of the signals from both transmitters. This is equivalent to receiving the signal from a single source via the composite channel given by the summation of the two channels from each transmitter. With a suitably long guard interval the receiver in these OFDM systems can successfully receive the combined signal from the two sources with enhanced signal strength over reception from a single transmitter, without Inter-Symbol Interference (ISI), and without needing to be 'aware' that the signal originated from two separate sources.

FIG. 1 shows a schematic block diagram of a transmitter with a space-time coder 20 adapted to receive an input signal 10 and to generate two transmission signals 30 which can be jointly received at a receiver.

However, although the SFN concept means that a simple receiver can be used, the combined signal can still undergo fading.

For the case of two transmission paths with respective transfer functions $h_1$ and $h_2$ to the receiver antenna, the combined transfer function becomes $(h_1+h_2)$, so that the SNR of the received signal is $(h_1+h_2)^2/n^2$ where n is the amplitude of noise and interference. But sometimes the particular values of $h_1$ and $h_2$ will cancel, significantly reducing the received power. Therefore the received signal quality could be highly variable.

SUMMARY OF THE INVENTION

An object of the present invention is to provide transmission scheme with improved throughput and coverage in cellular systems.

This object is achieved by a method as claimed in claim 1, a computer program product as claimed in claim 15, a multi-beam transmission system as claimed in claim 16, a transmitter device as claimed in claim 20, and a receiver device as claimed in claim 21.

Accordingly, in a cellular system where the same data is to be transmitted to one or more mobile terminals from more than one cell-site, at least one of a space-time and space-frequency coding is applied to the data from more than one cell-site. This means that identical data portions or blocks transmitted from different antennas may have a different transformation applied by the coder. Thus, increased user throughput at cell edge and increased cell throughput can be achieved by supporting more active users close to the cell-edge. This also leads to a better coverage.

The substantially different coverage areas may have a non-zero overlapping area. In the exemplary case of a cellular transmission system, the coverage areas may correspond to different cells of the cellular system. Furthermore, the at least two transmission beams may be generated by using different antennas at respective different cell sites.

Furthermore, beamformed pilot signals may be used to derive channel estimates for the substantially different coverage areas. Alternatively, if non-beamformed pilot signals are used, beamforming coefficients may be signaled to the receiver to derive channel estimates for the substantially different coverage areas.

The invention may be implemented using concrete hardware units, or alternative as a computer program product, e.g., embodied on a computer-readable medium or downloadable from network system, comprising code means for generating the steps of the above method when run on a computer device, e.g., provided at a respective transmitter device.

Assuming unity code rate, when a receiving terminal can receive a signal from only one antenna, the performance should be the same as for an uncoded system. Similarly, when the receiving terminal can receive signals from more than one antenna, but they use the same part of the code transformation, the performance will be no worse than for a single frequency network. However, if data with more than one code transformation is received from different transmit antennas, then the diversity benefit of the space-time or space-frequency coding is achieved.

To support this way of operation it is necessary that the receiver knows the timing of the received signals and their channel transfer functions. The timing knowledge can be obtained by transmission of synchronization signals from as few as one of the antennas provided the other transmissions have substantially the same timing (as is required in a SFN).

The necessary channel knowledge can be achieved by associating a specific (and known), and preferably orthogonal, pilot sequence with each part of the space-time block code. This allows the receiver to make a channel estimate corresponding to the channels for each antenna sending a particular part of the space-time or space-frequency code.

Beamforming may be applied. Then one or more transmissions can be considered to be from virtual antennas. The output from a virtual antenna (or beam) may be generated by multiplying a signal by a complex weighting factor (which may be frequency dependent) and transmitting each of the weighted signals from one element in an array of real antennas. If beamformed pilots are transmitted, then these can be used to derive appropriate channel estimates. If only unbeamformed pilots are available, then in order to derive channel estimates the beamforming coefficients must be known at the receiver, for example having been signaled by some signaling unit or arrangement. Different transmissions from different virtual antennas (or beams) may have different parts of a space-time or space-frequency code applied.

It is not necessarily a requirement to identify which physical (or virtual) antennas are transmitting which part of the block code.

Further advantageous embodiments are defined in the dependent claims.

BRIEF DESCRIPTION OF THE DRAWINGS

The present invention will now be described in greater detail based on embodiments with reference to the accompanying drawings, in which.

DESCRIPTION OF THE EMBODIMENTS

Embodiments of the present invention will now be described in greater detail based on a wireless network environment, such as for example a UMTS LTE network environment.

In wireless broadband systems, the available time, frequency and spatial diversity can be exploited using space-time codes, space-frequency codes or a combination thereof. As an example, space-time block codes are known as a way of gaining diversity in systems with multiple antennas. A block of symbols is transformed and transmitted from one antenna and the same data with a different transformation is transmitted from another antenna. The concept can be generalized into the frequency domain as space-frequency block codes or can be extended to cover both time and frequency. For the known two transmission antenna Alamouti scheme as described for example in S. M. Alamouti, "A simple transmitter diversity scheme for wireless communications", IEEE J. Select. Areas Commun., vol. 16, no. 8, pp. 1451-1458, October 1998, and a single receiver antenna, the received SNR becomes $((h_1)^2+(h_2)^2)/n^2$. This means that (at least in principle) all the received power can be recovered.

According to a first embodiment, an OFDM broadcast downlink is provided in a UMTS LTE network. Each of several cell-sites (corresponding to a base station device or enhanced Node B (E-Node B) in 3G terminology) supports transmissions from more than one antenna, each arranged to cover overlapping geographical areas.

Figure 1:
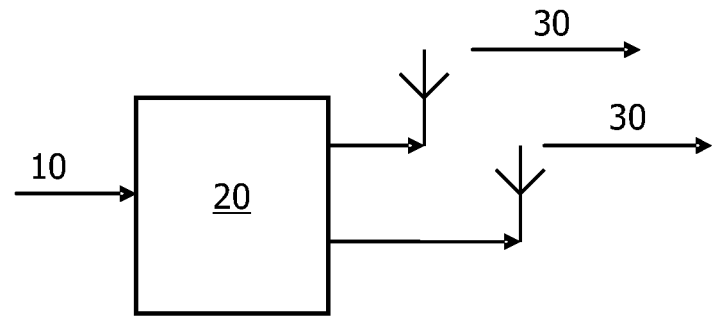
FIG. 1 shows a schematic block diagram of a transmitter with space-time coder.
Figure 2:
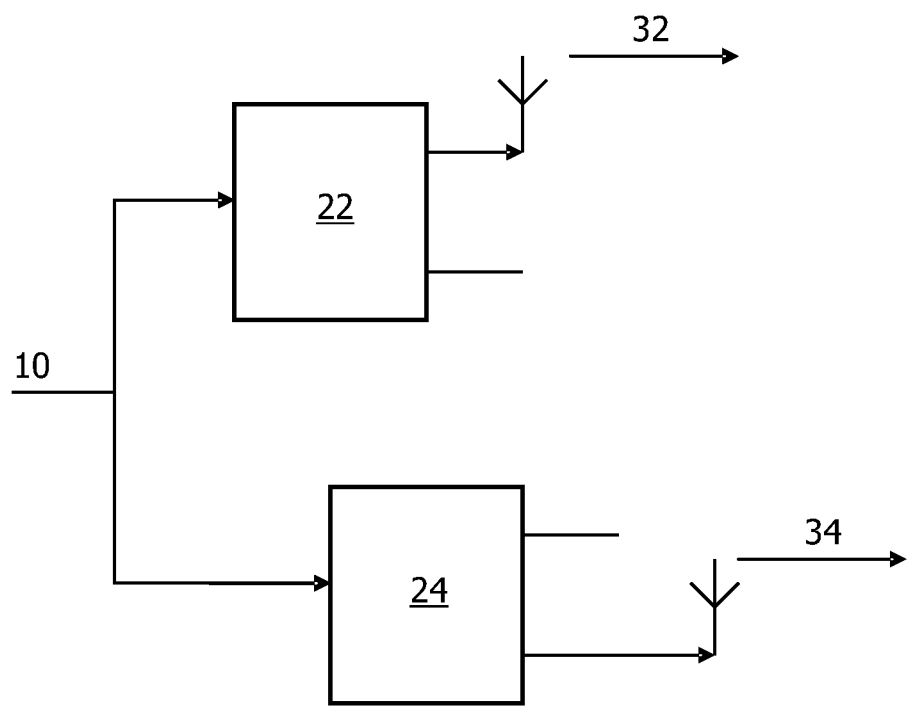
FIG. 2 shows a schematic block diagram of a transmitter with multiple sites, according to an embodiment.

FIG. 2 shows a schematic block diagram of a transmission arrangement according to the first embodiment with multiple transmission sites. An input signal 10 is supplied to each of a first space-time coder 22 which generates a first part 32 of a transmission signal and a second space-time coder 24 which generates a second part 34 of the transmission signal.

The transmissions from the same cell-site are synchronized, and the cell-sites are synchronized with each other over an extended geographical area. The synchronization may apply at both OFDM symbol level and frame level.

Furthermore, the same predetermined synchronization sequence (or data pattern) is transmitted from all the antennas of a given cell site. Optionally, different synchronization sequences may be transmitted from each cell site. This allows identification of each cell-site. The synchronization sequences are designed to have low cross-correlation, so that they can be transmitted using the same time and frequency resources.

In a modification, different synchronization sequences may be transmitted from each antenna of the same cell-site. In a further modification, the synchronization sequences may be transmitted using different frequency or time resources. In the latter case the timing offset should be pre-determined for a given sequence, in order to allow its use as a timing reference.

In a still further modification, different synchronization sequences may be transmitted from each antenna at a cell site.

Additionally, a pilot pattern may be transmitted from each antenna, wherein pilot transmissions between antennas are orthogonal and have low cross-correlation. There can be a pre-determined relationship between the pilot pattern transmitted from a particular antenna and the part of the block code applied to data transmissions from that antenna. In the case of the Alamouti space-time block code (for two transmission antennas) only two distinct pilot patterns would be needed. However, other space-time block codes with different numbers of antennas could be used as well.

In another modification of the first embodiment, the channel estimation is assumed to be carried out using the synchronization sequences, and there is a predetermined relationship between the synchronization sequence transmitted from a particular antenna and the part of the block code applied to data transmissions from that antenna.

Each antenna at every cell-site is assigned a part of the space-time block code (i.e. which would generate a part of the coded output from the space-time block coder). This could be such that where coverage obtained from different antennas overlaps, different parts of the space-time block code are used for those antennas as far as possible.

The data streams from each antenna and cell site are coded according to the assigned part of the space-time block code. The data may be transmitted in resource blocks extending over more than one OFDM symbol in both time and frequency domains.

At the receiver the following steps may be carried out for each time/frequency resource block:
  detect one of more synchronization sequences and determine timing reference;
  obtain channel estimate(s) for each of the possible pilot patterns (note that this implies that the number of channel estimates required is not greater than the number of parts of the space-time block code, with each channel estimate comprising an estimate of the composite channel from all receivable antennas transmitting a given part of the space-time block code);
  use the space-time block code to decode the data based on the obtained channel estimates.

In a further modification, the transmissions from different antennas at the cell site may have different parts of the space-time block code applied.

According to a second embodiment, an OFDM macro-diversity scheme is provided in a UMTS LTE network.

The second embodiment is similar to the first embodiment, except that the transmission is intended for a particular MT, and the signals are transmitted from a limited number of cell sites (or antennas at one cell site), e.g., an active set allocated to the MT. The different transmissions have different parts of a space-time block code applied.

According to a third embodiment, the proposed scheme is applied to UMTS Wideband CDMA (WCDMA) system with beamforming (e.g., by two virtual antennas) and common pilots.

In the third embodiment the Alamouti space-time block code can be applied and each of the two parts of the space-time block code is transmitted using a different beam (i.e. different virtual antennas). The physical antennas of the beamforming array are located at the same site. At the receiver the required channel estimates are derived from measurements of two orthogonal common pilot signals transmitted from different physical antennas (not beamformed), together with knowledge of the beamforming weights which are transmitted on a separate signaling channel.

According to a fourth embodiment, the proposed scheme can be applied to a UMTS WCDMA system with beamforming (two virtual antennas) and beamformed pilot signals.

In the fourth embodiment, the Alamouti space-time block code can be applied and each of the two parts of the space-time block code is transmitted using a different beam (i.e. different virtual antennas). The physical antennas of the beamforming array are located at the same site. At the receiver the required channel estimates are derived from two orthogonal pilot signals each transmitted using one of the beams (virtual antennas). As in the previous embodiments, the virtual antennas may be co-located (at the same cell-site) or not (at different cell-sites).

In any embodiment it is advantageous if the parts of the space-time (or space-frequency) code are determined such that the transmitted data can be correctly recovered by receiving any one of the individual signals carrying a part of the space-time block code. In this case the total coverage area would equal, or more typically, exceed, the union of the coverage areas reached by each of the individual signals.

In summary, use of space-time block codes or space-frequency block codes in cellular systems has been described. The same data is transmitted from different antennas with different coverage areas, corresponding to different cells. The different data streams have different parts of the space-time block codes applied. A MT can combine the different parts of the space-time block codes in different received signals. This provides better performance than the known techniques for single frequency networks. The invention can also be applied to antennas with different coverage areas from the same site, and different beams formed with antenna arrays.

It is to be noted that the present invention can be applied to any wireless communication system, particular in cellular systems like UMTS LTE. Moreover, any kind of space-time coding, space-frequency coding or combined space-time-frequency coding could be used to explore the desired multi-site diversity effects. The above embodiments may thus vary within the scope of the attached claims.

The invention claimed is:

1. A method of transmitting information in a multi-beam transmission system, said method comprising:
  transmitting data streams from different beams with substantially different coverage areas corresponding to different cells of a cellular transmission system, such that each of the antennas generates different data streams;
  wherein each data stream is formed by:
    applying a plurality of different assigned parts of at least one of a space-time and a space-frequency coding to a same predetermined portion of said information such that a different code is applied to said predetermined portion of said information; and
  transmissions of any of said data streams from different beams from a same transmission site are synchronized.

2. The method according to claim 1, wherein said substantially different coverage areas have a non-zero overlapping area.

3. The method according to claim 1, further comprising:
  transmitting at least one synchronization signal via at least one of the different data streams generated from the different beams.

4. The method according to claim 1, further comprising:
  transmitting predetermined pilot signals allocated to different beams.

5. The method according to claim 4, wherein said pilot signals are orthogonal signals.

6. The method according to claim 1, further comprising:
  applying beamforming to achieve said substantially different coverage areas.

7. The method according to claim 1, wherein said beamforming comprises:

transmitting weighted signals from respective elements of an antenna array.

8. The method according to claim 6, further comprising: using beamformed pilot signals to derive channel estimates for said substantially different coverage areas.

9. The method according to claim 6, further comprising: using non-beamformed pilot signals and signaling beamforming coefficients to a receiver to derive channel estimates for said substantially different coverage areas.

10. The method according to claim 1, wherein said transmission is a cellular broadcast transmission, wherein, cell-sites are synchronized with each other over a predetermined geographical area.

11. The method according to claim 1, wherein said transmission is directed from a limited number of cell sites to a predetermined terminal device.

12. A computer program product embodied on a non-transitory computer readable medium comprising code for causing a computer device to execute the steps of:
   transmitting data streams from different beams with substantially different coverage areas corresponding to different cells of a cellular transmission system, such that each of the beams generates different data streams;
   wherein each data stream is formed by:
      applying a plurality of different assigned parts of at least one of a space-time and a space-frequency coding to a predetermined portion of said information such that a different code is applied to said predetermined portion of said information; and
      transmissions of any of said data streams from a same transmission site are synchronized.

13. A multi-beam communication system, comprising:
   a transmitter device for transmitting data streams from different beams with substantially different coverage areas corresponding to different cells of a cellular transmission system, said transmitter comprising:
      a coding device for applying different assigned parts of at least one of a space-time and a space-frequency coding to a same predetermined portion of said information such that a different code is applied to predetermined portion of said information to generate different data streams, wherein said different data streams are applied to different ones of said beams; wherein transmissions of said data streams from a same cell-site are synchronized, and
   at least one receiver device for receiving said transmitted data streams and for decoding said received data streams it based on channel estimates.

14. The system according to claim 13, wherein said transmitter device is configured to transmit a pilot signal by using at least one of the data streams and comprising pilot patterns, wherein each pilot pattern corresponds to a predetermined portion of said at least one of said space-time and space-frequency coding assigned to the respective one of the data streams.

15. The system according to claim 13, wherein said transmitter device is configured to use sets of beamforming weights, each set corresponding to respective data streams.

16. A transmitter device, comprising:
   a coding unit for applying a plurality of different assigned parts of at least one of a space-time and a space-frequency coding to a predetermined portion of information to be transmitted such that a plurality of different code is applied to said predetermined portion of said information to form different data streams, and
   a transmitting unit for transmitting from different beams, said beams having substantially different coverage areas corresponding to different cells of a cellular transmission system, corresponding ones of said different data streams, wherein transmissions from a same transmission site are synchronized.

* * * * *